(12) United States Patent
Haglund

(10) Patent No.: US 7,522,411 B2
(45) Date of Patent: Apr. 21, 2009

(54) METHOD OF DISSIPATING HEAT FOR NOTEBOOK COMPUTER AND DEVICE THEREOF

(76) Inventor: Dean Haglund, PMB 208, 5850 W. 3rd St., Los Angeles, CA (US) 90036

( * ) Notice: Subject to any disclaimer, the term of this patent is extended or adjusted under 35 U.S.C. 154(b) by 28 days.

(21) Appl. No.: 11/786,956

(22) Filed: Apr. 13, 2007

(65) Prior Publication Data

US 2008/0253075 A1    Oct. 16, 2008

(51) Int. Cl.
*H05K 7/20* (2006.01)

(52) U.S. Cl. ................. 361/683; 361/686; 361/688; 248/346.04; 248/346.3; 248/917; 248/918

(58) Field of Classification Search ............... 361/683, 361/686, 688, 689, 700, 704, 707, 714; 607/96, 607/117; 190/107; 248/346, 444, 450, 451, 248/917, 918, 924, 442, 448
See application file for complete search history.

(56) References Cited

U.S. PATENT DOCUMENTS

| | | | | |
|---|---|---|---|---|
| 5,623,869 A | * | 4/1997 | Moss et al. | 108/43 |
| 5,969,939 A | * | 10/1999 | Moss et al. | 361/686 |
| 6,132,455 A | * | 10/2000 | Shang | 607/108 |
| 6,466,438 B1 | * | 10/2002 | Lim | 361/687 |
| 6,754,072 B2 | * | 6/2004 | Becker et al. | 361/687 |
| 6,795,311 B2 | * | 9/2004 | Pokharna et al. | 361/687 |
| 7,068,508 B2 | * | 6/2006 | Patel et al. | 361/699 |
| 7,275,724 B1 | * | 10/2007 | Ward | 248/118.5 |
| 7,324,340 B2 | * | 1/2008 | Xiong | 361/700 |
| 2006/0291161 A1 | * | 12/2006 | Tran et al. | 361/688 |

FOREIGN PATENT DOCUMENTS

JP    2002031448 A    *    7/2000

* cited by examiner

*Primary Examiner*—Michael V Datskovskiy
(74) *Attorney, Agent, or Firm*—Raymond Y. Chan; David and Raymond Patent Firm

(57) ABSTRACT

A cooling device, which is arranged for incorporating with a portable electronic device, includes a portable cooling station and a power-free cooling pad. The cooling station has a top platform for supporting the electronic device thereon. The cooling pad is adapted for thermally communicating with the bottom side of the electronic device when the electronic device sits on the top platform of the cooling station to instantly cool down the electronic device from the bottom side thereof so as to produce an optimally cool environment as the electronic device operates.

11 Claims, 4 Drawing Sheets

METHOD OF DISSIPATING HEAT FOR NOTEBOOK COMPUTER AND DEVICE THEREOF

BACKGROUND OF THE PRESENT INVENTION

1. Field of Invention

The invention relates to a process and a methodology for controlling the temperature of a device that experiences heat generated from electrical devices contained therein, and more particularly to a device could be provide an optimally cool environment in which said notebook computer operates.

2. Description of Related Arts

There are thousands of existing dissipating fans for laptop to dissipate the heat generated therefrom. No matter which types of the fans are, the dissipating system can only suck out the heat from the laptop but cannot provide a cool environment for the laptop to operate. In addition, the dissipating system requires power withdrawing from the laptop such that the dissipating system will shortens the life span of the battery of the laptop. For example, the battery for the laptop can last for 4 to 5 hours. However, when the dissipating system electrically connects with the laptop, the battery can only work with the fans less than 3 hours.

Furthermore, the dissipating system itself will also generate heat and noise. In other words, the efficiency of the dissipating system will be significantly decreasing after a period of continuous use. The noise from the dissipating system will also distract the user from his or her work.

Another drawback of the dissipating system is that the user must carry the dissipating system with the laptop everywhere. The dissipating system generally comprises a metal casing to support the laptop thereon and a fan assembly received in the metal casing. The overall weight of the dissipating system is relatively heavy in comparison with the laptop. Therefore, the dissipating system becomes an annoying necessary for the user to carry in the carrying bag. Thus, the dissipating system must be taken good care because any unwanted impact will damage the dissipating system. Once the internal components, including the fan assembly, of the dissipating system are broken, the user is unable to fix or replace the damaged component but merely purchases another new dissipating system.

SUMMARY OF THE PRESENT INVENTION

A main object of the present invention is to solve the above prior art problems and provide a method of dissipating heat for notebook computer, wherein the heat generated from the notebook computer is adapted for substantially transferring to the cooling pad through the bottom surface so as to provide an optimally cool environment in which the notebook computer operates.

Another object of the present invention is to provide a cooling device for a notebook computer, wherein the top platform of the cooling station is inclinedly extended at position that a rear edge of the top platform is positioned higher than a front edge thereof not only for inclinedly supporting the bottom side of the electronic device but also for maximizing an opening area of the cooling cavity to thermally communicate with the bottom side of the electronic device.

Another object of the present invention is to provide a cooling device for a notebook computer, wherein the power-free cooling pad is used without any power source for creating a cool environment for instantly cooling down the notebook. Therefore, no heat or noise is generated by the cooling device as a side effect. In other words, the cooling device of the present invention does not withdraw any power from the notebook so as to keep the original configuration of the notebook.

Another object of the present invention is to provide a cooling device, wherein the cooling station has an inner insulating layer provided at an inner side of the cooling station to prolong the cooling duration of the cooling agent.

Another object of the present invention is to provide a cooling device, wherein the cooling station and the cooling pad are made of force absorbing material, such that the user is able to carry the cooling device in a hassle-free manner and to protect the notebook computer as a force absorbing panel when the cooling device and the notebook computer are disposed in the carrying bag.

Another object of the present invention is to provide a cooling device wherein the material of the cooling station is very light and is made by reusable material, so that the cooling station is easy for people to carry and environmental friendly.

In general, the cooling device for a portable electronic device having a bottom side includes a portable cooling station, and a power-free cooling pad. It not only lowers down its temperature by cooling pad, but also it extends the life span for battery by optimizing the operation temperature thereof. Furthermore, the material, of the cooling station is easy for people to carry and recovery.

Accordingly, in order to accomplish the above objects, the present invention provides a cooling device for a portable electronic device having a bottom side, comprising:

a portable cooling station having a top platform for substantially supporting the bottom side of the portable electronic device and a cooling cavity indently formed on the top platform for communicating with the bottom side of the electronic device; and a power-free cooling pad, which is disposed in the cooling cavity of the cooling station, comprising a reusable cooling agent having a predetermined cooling duration, wherein the cooling pad is adapted for thermally communicating with the bottom side of the electronic device when the electronic device sits on the top platform of the cooling station to instantly cool down the electronic device from the bottom side thereof so as to produce an optimally cool environment as the electronic device operates.

These and other objectives, features, and advantages of the present invention will become apparent from the following detailed description, the accompanying drawings, and the appended claims.

DETAILED DESCRIPTION OF THE PREFERRED EMBODIMENT

Figure 1:
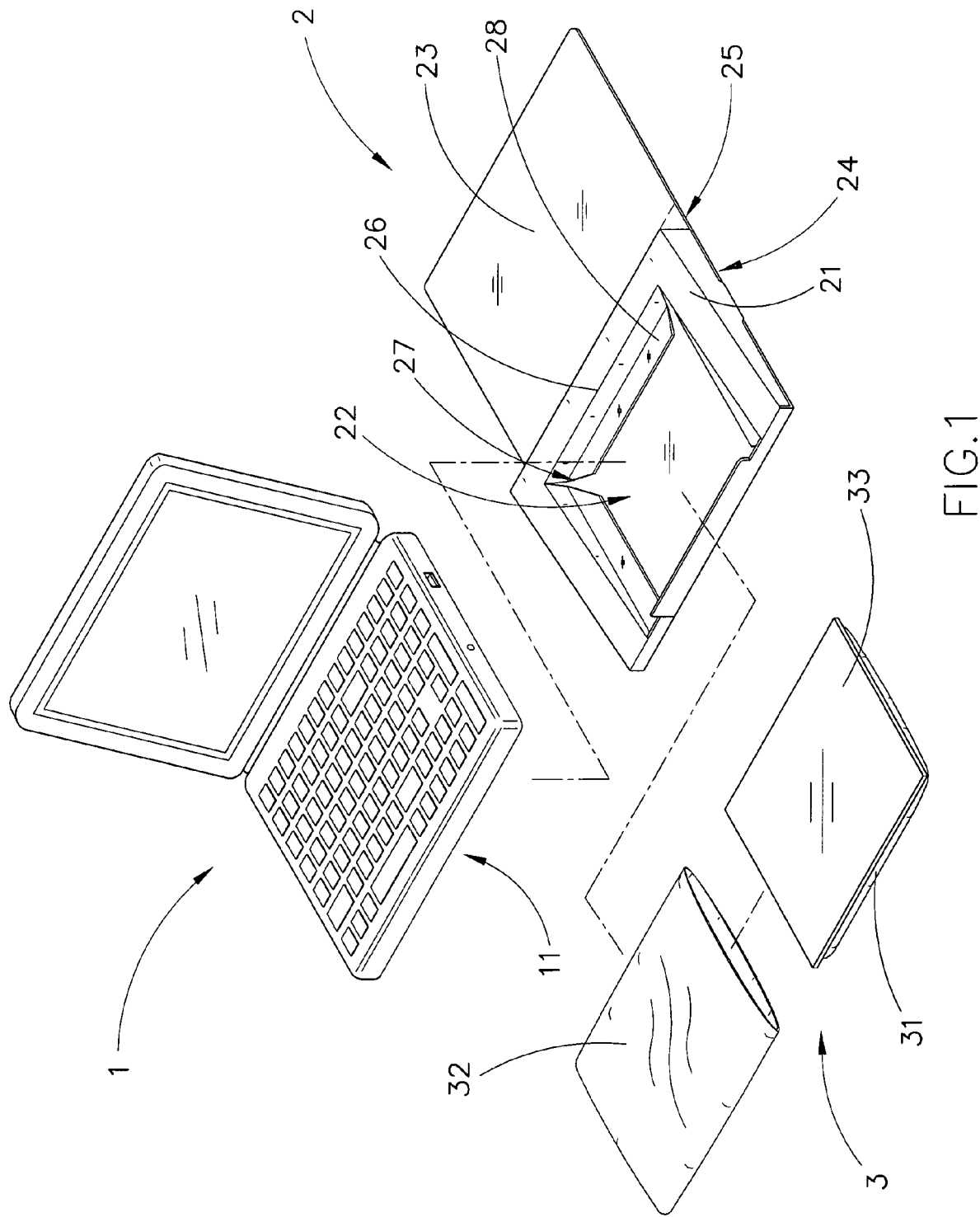
FIG. 1 is a perspective view of a cooling device incorporating with a portable electronic device according to a preferred embodiment of the present invention.
Figure 2:
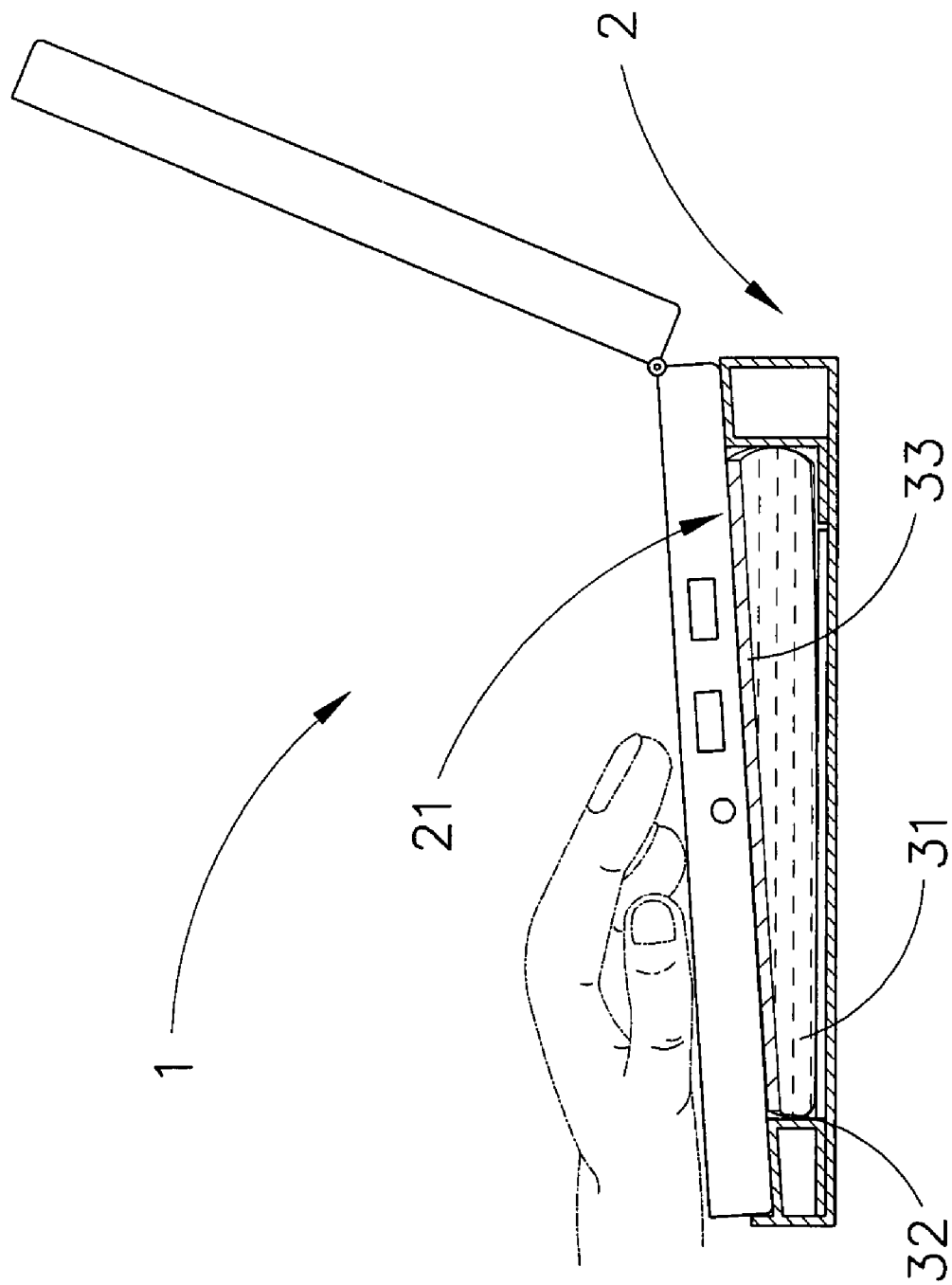
FIG. 2 is a sectional view of the cooling device according to the above preferred embodiment of the present invention, illustrating the portable electronic device being supported on the cooling station and being cooled down by the cooling pad.
Figure 3:
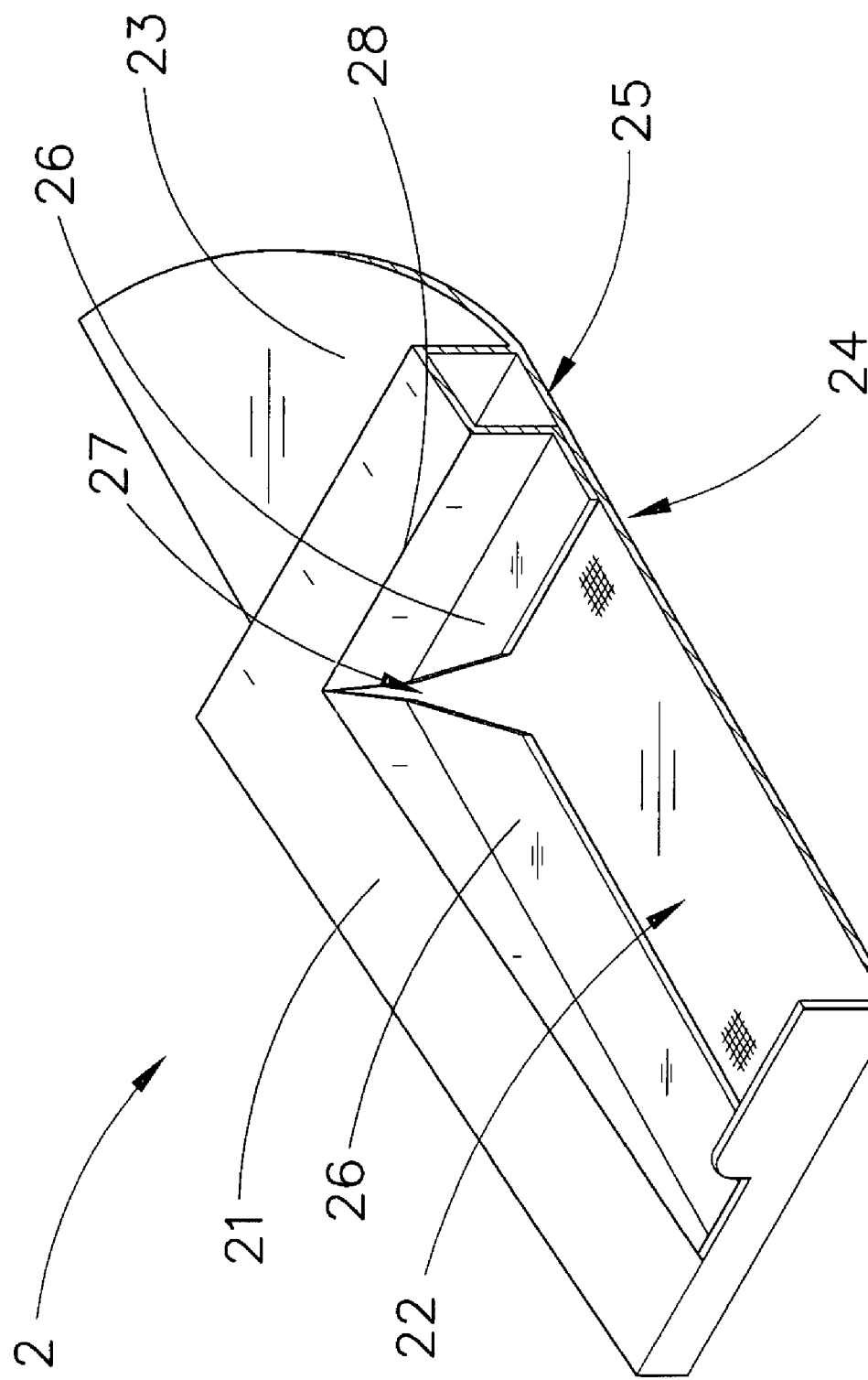
FIG. 3 is a partially perspective view of the cooling station according to the above preferred embodiment of the present invention, illustrating the rigid structure of the cooling station to support the portable electronic device.

Referring to FIG. 1 to FIG. 3 of the drawings, a cooling device according to a preferred embodiment of the present invention is illustrated, wherein the cooling device is arranged for incorporating with a portable electronic device 1 to instantly cool down the electronic device 1.

Accordingly, the electronic device 1, such as a notebook computer or a portable DVD player, has a bottom side 11 arranged to sit on a supporting surface for the user operating the electronic device 1. For example, the user may put the notebook computer on his/her lap or a desk surface in order to operate the notebook computer.

According to the preferred embodiment, the cooling device comprises a portable cooling station 2 and a power-free cooling pad 3.

The cooling station 2 has a top platform 21 for substantially supporting the bottom side 11 of the portable electronic device 1 and a cooling cavity 22 indently formed on the top platform 21 for communicating with the bottom side 11 of the electronic device 1.

The cooling pad 3, which is disposed in the cooling cavity 31 of the cooling station 2, does not require any power from the electronic device 1 to optimize the power usage of the electronic device 1. The cooling pad 3 comprises a reusable cooling agent 31 having a predetermined cooling duration, wherein the cooling pad 3 is adapted for thermally communicating with the bottom side 11 of the electronic device 1 when the electronic device 1 sits on the top platform 21 of the cooling station 2 to instantly cool down the electronic device 1 from the bottom side 11 thereof so as to produce an optimally cool environment as the electronic device 1 operates.

It is worth mentioning that the top platform 21 of the cooling station 2 is inclinedly extended at position that a rear edge of the top platform 21 is positioned higher than a front edge thereof not only for inclinedly supporting the bottom side 11 of the electronic device 1 but also for maximizing an opening of the cooling cavity 22 to thermally communicate with the bottom side 11 of the electronic device 1. In other words, when the electronic device 1 is supported on the top platform 21 of the cooling station 2, the electronic device 1 is positioned in a slant manner such that the user is able to comfortably operate the electronic device 1 especially for notebook computer. In addition, the opening of the cooling cavity 22 is defined along the top and rear edges of the top platform 21. Therefore, the opening area of the cooling cavity 22 is substantially enlarged for the cooling pad 3 to communicate with the bottom side 11 of the electronic device 1.

The cooling station 2 comprises a supporting base 24 having a trapezoid cross section and forming the top platform 21 at a top side of the supporting base, and a cover panel 23 integrally extended from the supporting base to fold between a storage position that the cover panel 23 is folded on the top platform 21 to enclose the cooling pad 3 within the cooling cavity 22 and an operation position that the cover panel 23 is folded underneath the supporting base for the bottom side 11 of the electronic device 1 sitting on the top platform of the supporting base.

Moreover, the supporting base 24 comprises a bottom wall 25 integrally extended to the cover panel 23, a top wall 26 foldably extended from the bottom wall 25 and forming the cooling cavity 22 within an inner peripheral edge of the top wall 26, and a plurality of L-shaped retention walls 28 downwardly and integrally extended from the inner peripheral edge 27 of the top wall to sit on the bottom wall for rigidly supporting the bottom side 11 of the electronic device 1 on the top wall.

It is worth mentioning that the cooling station 2 further has an inner insulating layer 2611 provided at an inner side of the cooling station to prolong the cooling duration of the cooling agent 5.

On the other hand, the cooling pad 3 comprises a holding pocket 32, a pad body which contains the gel-like cooling agent 31 and receives in the holding pocket 32, and a reinforcing panel 33 disposed in the holding pocket 32 at a position underneath the pad body to evenly retain the cooling agent 31 within the cooling cavity 22 in a flat manner. Accordingly, the user is able to put the cooling pad 3 into the refrigerator such that the cooling agent 31 is adapted to retain the energy and to release it to cool down the electronic device 1. Preferably, the gel-like cooling agent 31 can be self-deformed to fittingly contact with the bottom side 11 of the electronic device 1 by the weight thereof when the electronic device 1 sits on the top platform 21 of the cooling station 2. Alternatively, the cooling agent 31 can be other form such as solid form for cooling down the electronic device 1.

Accordingly, the present invention also provides a method of providing a cool environment for the portable computer, comprising the steps of:

(a) disposing a power-free cooling pad 3 in a cooling cavity 22 of a portable cooling station 2, wherein the cooling pad 3 comprises a reusable cooling agent 31 having a predetermined cooling duration;

(b) supporting the portable computer on the cooling station 2 at a position that a bottom side 11 of the portable computer is sat on a top platform 21 of the cooling station 2 to thermally communicate the bottom side 11 of the portable computer with the cooling cavity; and (c) instantly cooling down the portable computer from the bottom side 11 thereof via the cooling pad 3.

Figure 4:
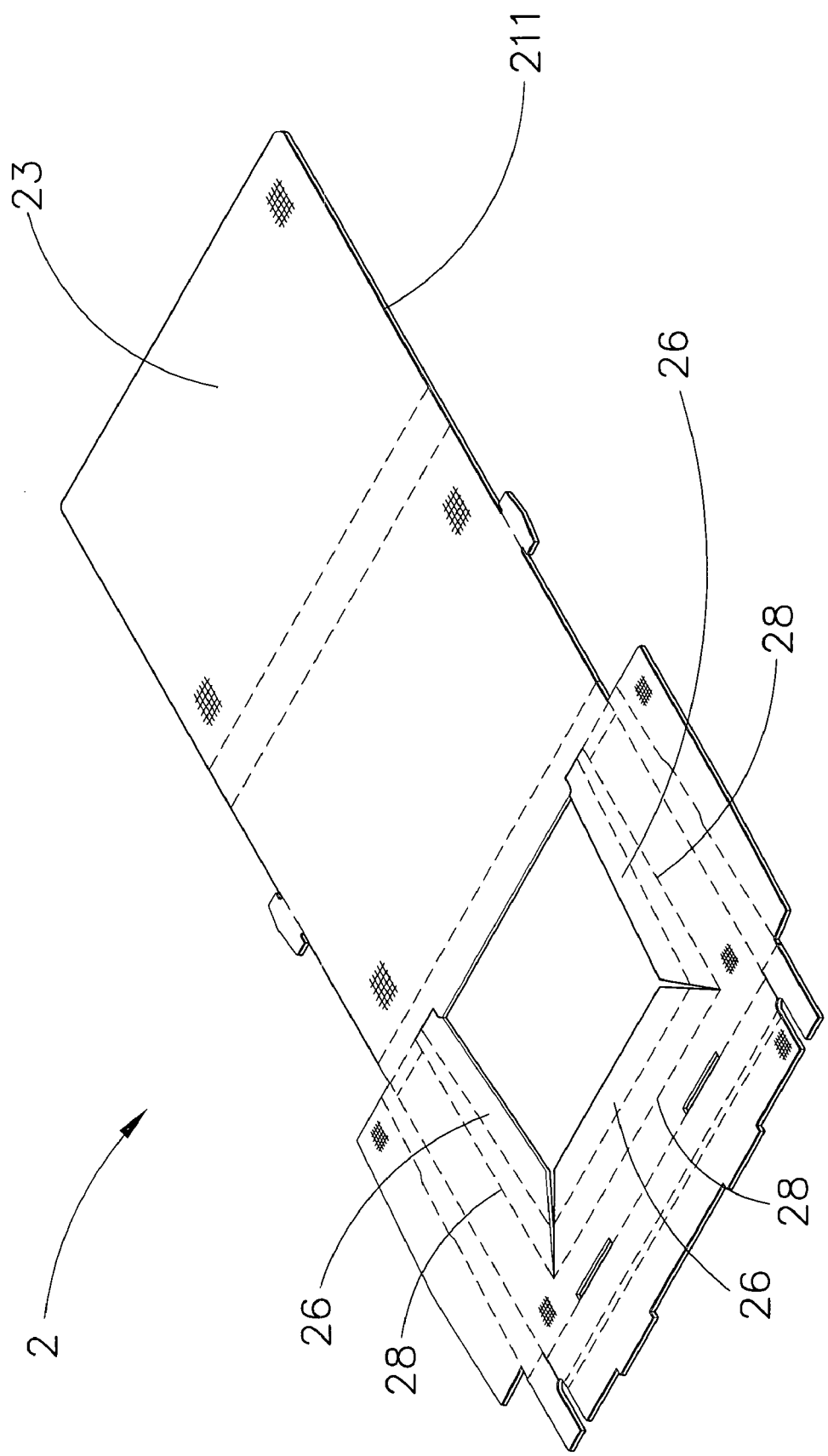
FIG. 4 is a perspective view of the cooling station according to the above preferred embodiment of the present invention, illustrating the cooling station having a one-piece pane structure.

Referring to FIG. 4 of the drawings, the cooling station 2 has a one-piece panel structure having a plurality of folding lines formed thereon, wherein the top and bottom walls of the supporting base and the panel cover are formed by folding the panel along the folding lines. In other words, the manufacturing process of the cooling station 2 of the instant invention is simple and is in low cost. Furthermore, the material of the cooling station 2 is very light and is made by reusable material, so that the cooling station 2 is easy for people to carry and recovery.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A cooling device for a portable electronic device having a bottom side, comprising:

a portable cooling station having a top platform for substantially supporting said bottom side of said portable electronic device and a cooling cavity indently formed on said top platform for communicating with said bottom side of said electronic device; and a power-free cooling pad, which is disposed in said cooling cavity of said cooling station, comprising a reusable cooling agent having a predetermined cooling duration, wherein said cooling pad is adapted for thermally communicating with said bottom side of said electronic device when said electronic device sits on said top platform of said cooling station to instantly cool down said electronic device from said bottom side thereof so as to produce an optimally cool environment as said electronic device operates, wherein said cooling station comprises a supporting base having a trapezoid cross section and forming said top platform at a top side of said supporting base, and a cover panel integrally extended from said supporting base to fold between a storage position that said cover panel is folded on said top platform to enclose said cooling pad within said cooling cavity and an operation position that said cover panel is folded underneath said supporting base for said bottom side of said electronic device sitting on said top platform of said supporting base.

2. The cooling device, as recited in claim 1, wherein said supporting base comprises a bottom wall integrally extended to said cover panel, a top wall foldably extended from said bottom wall and forming said cooling cavity within an inner peripheral edge of said top wall, and a plurality of L-shaped retention walls downwardly and integrally extended from said inner peripheral edge of said top wall to sit on said bottom wall for rigidly supporting said bottom side of said electronic device on said top wall.

3. A cooling device for a portable electronic device having a bottom side, comprising:

a portable cooling station having a top platform for substantially supporting said bottom side of said portable electronic device and a cooling cavity indently formed on said top platform for communicating with said bottom side of said electronic device; and a power-free cooling pad, which is disposed in said cooling cavity of said cooling station, comprising a reusable cooling agent having a predetermined cooling duration, wherein said cooling pad is adapted for thermally communicating with said bottom side of said electronic device when said electronic device sits on said top platform of said cooling station to instantly cool down said electronic device from said bottom side thereof so as to produce an optimally cool environment as said electronic device operates, wherein said top platform of said cooling station is inclinedly extended at position that a rear edge of said top platform is positioned higher than a front edge thereof not only for inclinedly supporting said bottom side of said electronic device but also for maximizing an opening of said cooling cavity to thermally communicate with said bottom side of said electronic device, wherein said cooling station comprises a supporting base having a trapezoid cross section and forming said top platform at a top side of said supporting base, and a cover panel integrally extended from said supporting base to fold between a storage position that said cover panel is folded on said top platform to enclose said cooling pad within said cooling cavity and an operation position that said cover panel is folded underneath said supporting base for said bottom side of said electronic device sitting on said top platform of said supporting base.

4. The cooling device, as recited in claim 3, wherein said cooling station further has an inner insulating layer provided at an inner side of said cooling station to prolong said cooling duration of said cooling agent.

5. The cooling device, as recited in claim 3, wherein said cooling pad comprises a holding pocket, a pad body which contains said gel-like cooling agent and receives in said holding pocket, and a reinforcing panel disposed in said holding pocket at a position underneath said pad body to evenly retain said cooling agent within said cooling cavity in a flat manner.

6. The cooling device, as recited in claim 3, wherein said supporting base comprises a bottom wall integrally extended to said cover panel, a top wall foldably extended from said bottom wall and forming said cooling cavity within an inner peripheral edge of said top wall, and a plurality of L-shaped retention walls downwardly and integrally extended from said inner peripheral edge of said top wall to sit on said bottom wall for rigidly supporting said bottom side of said electronic device on said top wall.

7. The cooling device, as recited in claim 6, wherein said cooling station further has an inner insulating layer provided at an inner side of said cooling station to prolong said cooling duration of said cooling agent.

8. The cooling device, as recited in claim 7, wherein said cooling pad comprises a holding pocket, a pad body which contains said gel-like cooling agent and receives in said holding pocket, and a reinforcing panel disposed in said holding pocket at a position underneath said pad body to evenly retain said cooling agent within said cooling cavity in a flat manner.

9. A cooling device for a portable electronic device having a bottom side, comprising:

a portable cooling station having a top platform for substantially supporting said bottom side of said portable electronic device and a cooling cavity indently formed on said top platform for communicating with said bottom side of said electronic device; and a power-free cooling pad, which is disposed in said cooling cavity of said cooling station, comprising a reusable cooling agent having a predetermined cooling duration, wherein said cooling pad is adapted for thermally communicating with said bottom side of said electronic device when said electronic device sits on said top platform of said cooling station to instantly cool down said electronic device from said bottom side thereof so as to produce an optimally cool environment as said electronic device operates, wherein said cooling station further has an inner insulating layer provided at an inner side of said cooling station to prolong said cooling duration of said cooling agent.

10. A method of providing a cool environment for a portable computer, comprising the steps of:

(a) disposing a power-free cooling pad in a cooling cavity of a portable cooling station, wherein said cooling pad comprises a reusable cooling agent having a predetermined cooling duration;

(b) supporting said portable computer on said cooling station at a position that a bottom side of said portable computer is sat on a top platform of said cooling station to thermally communicate said bottom side of said portable computer with said cooling cavity; and (c) instantly cooling down said portable computer from said bottom side thereof via said cooling pad, wherein before the step (a), further comprising a step of cooling said cooling agent in a freezer before said cooling pad is disposed in said cooling cavity, wherein the step (a) further comprises a step of providing an inner insulating layer on an inner side of said cooling cavity to prolong said cooling duration of said cooling agent.

11. A method of providing a cool environment for a portable computer, comprising the steps of:

(a) disposing a power-free cooling pad in a cooling cavity of a portable cooling station, wherein said cooling pad comprises a reusable cooling agent having a predetermined cooling duration;

(b) supporting said portable computer on said cooling station at a position that a bottom side of said portable computer is sat on a top platform of said cooling station to thermally communicate said bottom side of said portable computer with said cooling cavity; and (c) instantly cooling down said portable computer from said bottom side thereof via said cooling pad, wherein before the step (a), further comprising a step of cooling said cooling agent in a freezer before said cooling pad is disposed in said cooling cavity, wherein the step (b) further comprises a step of inclinedly supporting said bottom side of said portable computer on said top platform for maximizing an opening of said cooling cavity to thermally communicate with said bottom side of said portable computer, wherein the step (a) further comprises a step of providing an inner insulating layer on an inner side of said cooling cavity to prolong said cooling duration of said cooling agent.

* * * * *